Patented Apr. 7, 1942

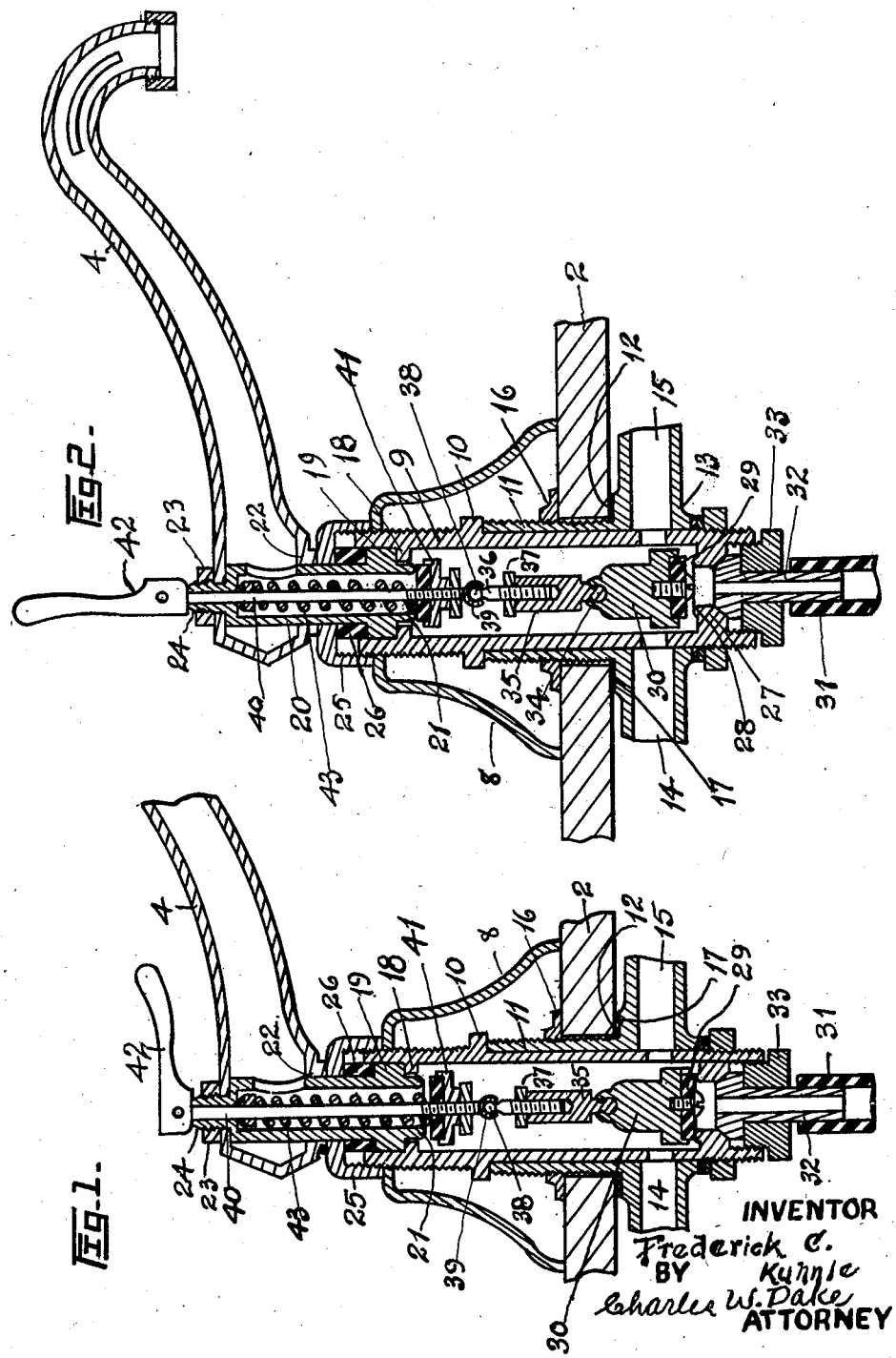

2,278,789

UNITED STATES PATENT OFFICE 2,278,789

PLUMBING STRUCTURE

Frederick C. Kuhnle, Grand Haven, Mich.

Application November 13, 1939, Serial No. 304,145

1 Claim. (Cl. 277—21)

My invention relates to improvements in plumbing structures in which a plurality of valves and faucets cooperate to supply and control water delivered to sinks, as when dishes are being washed therein. The objects of my improvements are, first, to provide a plumbing structure whereby hot and cold water may be selectively drawn for any purpose; second, to provide a plumbing structure that will obviate the danger of scalding through carelessness on the part of the operator; third, the provide a plumbing structure wherein the hot water will be prevented from flowing through the discharge spout when hot water is drawn from the sprinkler head, when after drawing water therefrom, the water will be prevented from flowing through the sprinkler head; fourth, to provide a plumbing structure that will be artistic in appearance; fifth, to provide a plumbing structure that will not leak.

I attain these named objects and other objects that appear from a perusal of the following description when taken in connection with the accompanying drawing illustrating the structure, and referring to the drawing:

Figure 1 is an enlarged vertical sectional view of the water distribution valve whereby either hot or cold water may be drawn selectively.

Figure 2 is a vertical sectional view of the water distribution valve as shown in Fig. 1, except the valve is in the closed position for the discharge spout and open to permit water to be drawn from the sprinkler head.

Throughout the several views of the drawing herein illustrating my improved plumbing structure, similar numerals refer to similar parts of the structure, as follows:

Numeral 2 represents the back ledge of the sink; 4 the water discharge spout. The upwardly extending portions of the selective water spout control valve is encased in cone-like casing 8.

Referring now to Figures 1 and 2, numeral 9 designates the spout control valve housing having exterior thereof, outwardly extending annular flange 10 whereby the housing 9 is positioned and secured to the sink by sleeve 11 extending upwardly from the annular shoulder 12 of the water connector fitting 13, having extending therefrom at opposite sides thereof, hot and cold water supply pipes 14 and 15. Valve housing 9, screw-threaded at its lower end, is held securely in the sleeve 11 by nut 16 having between it and the fitting 13, packing 17. The valve housing at its upper end has inwardly extending annular flange 18, against which rests an enlarged head 19, turnable hollow spout connecting member 20, forming valve seat 21 at its lower end and connected to the spout 22 at its upper end, there being holes at its upper end communicating with the interior of the spout, which is connected to the spout connecting member 20 by nut 23, screw-threaded onto the upwardly extending threaded boss 24. At the upper end of the housing 9, and screw threaded thereon, is gland nut 25 having interiorly between it and the head 19, flexible packing 26, whereby the said head 19 and the top of the valve housing 9 are held in frictional contact with the flange 18, thereby allowing the spout to be turned as desired. The valve housing 9, at its lower portion, has inwardly extending flange 27 forming valve seat 28 against which rests the packing member 29 of the valve 30, by which the water is conducted to a sprinkler head (not shown) by flexible tube 31, having hollow connecting nipple 32 secured to the valve housing 9, by gland nut 33 internally screw threaded to the housing. To the upper end of the valve 30 is secured, as by ball and socket joint 34, valve stem adjusting nut 35 having screw threaded therin valve stem 36, having thereon lock nut 37, and at its upper end ball 38 in socket 39, at the lower end of the extension valve stem 40, carrying spout control valve 41 that engages the seat 21 when water is not flowing from the spout 22. The spout control valve 41 together with the sprinkler head control valve 30 is operated by cam lever 42 hingedly connected to the upper end of the extension valve stem 40 and helical spring 43.

In Figure 2 the valves 30 and 41 are in opposite positions as shown in Figure 1, that is, while in Figure 1 the spout control valve is in open position and the sprinkler head control valve is in closed position, in Figure 2, the spout control valve is in closed position and having been raised against its seat by cam lever 42, is forced upwardly by the hand, as shown, and the sprinkler head control valve 30 is in open position.

In the operation of my improved plumbing structure, the proper connections having been made with the cold and hot water supply, the admission of hot or cold water to the supply passages 14 and 15 will permit flow to the selective water control valve in which, should the valve therein be in its lower position and against its lower seat, the water will flow from the spout 22; or should the said valve be against its upper seat, the water will flow through the flexible tube 31 to a sprinkler head.

Having described my present invention, the rights which I desire to secure are set forth in the claim, as follows:

In a plumbing structure having cold and hot water connections, and a combined cold and hot water discharge spout, a selective cold and hot water control valve structure comprising in combination a housing having therein, a pair of oppositely facing ring like valve seats, a pair of disc like valves for selectively engaging the said seats, each valve having a stem extending toward the other valve and having a ball and socket connection whereby each of said valves are free to assume a tight fluid sealing contact with its respective seat, and one of said valves having a valve stem extending through the top of the water discharge spout and having a camming lever pivotally connected to the last said stem for closing the last named valve substantially as described.

FREDERICK C. KUHNLE.